United States Patent
Kuki (10) Patent No.: US 11,167,279 B2
(45) Date of Patent: Nov. 9, 2021

(54) PLUGGED HONEYCOMB STRUCTURE (71) Applicant: NGK INSULATORS, LTD., Nagoya (JP)

(72) Inventor: Tatsuyuki Kuki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 480 days.

(21) Appl. No.: 15/906,252

(22) Filed: Feb. 27, 2018

(65) Prior Publication Data

US 2018/0264453 A1 Sep. 20, 2018

(30) Foreign Application Priority Data

Mar. 14, 2017 (JP) .............................. JP2017-048701

(51) Int. Cl.
*B01D 46/24* (2006.01)
*B01J 35/04* (2006.01)
*C04B 35/101* (2006.01)
*C04B 35/195* (2006.01)
*C04B 35/185* (2006.01)
(Continued)

(52) U.S. Cl.
CPC ............ *B01J 35/04* (2013.01); *B01D 46/247* (2013.01); *B01D 46/2429* (2013.01); *C04B 35/101* (2013.01); *C04B 35/185* (2013.01); *C04B 35/195* (2013.01); *C04B 35/478* (2013.01); *C04B 35/565* (2013.01);
(Continued)

(58) Field of Classification Search
None
See application file for complete search history.

(56) References Cited

U.S. PATENT DOCUMENTS

2003/0041574 A1 3/2003 Noguchi et al.
2003/0093982 A1 5/2003 Suwahe et al.
(Continued)

FOREIGN PATENT DOCUMENTS

CN 105392759 A 3/2016
JP 2002-219319 A1 8/2002
(Continued)

OTHER PUBLICATIONS

Chinese Office Action (Application No. 201810170459.4) dated Dec. 2, 2019 (with English translation).
(Continued)

*Primary Examiner* — Humera N. Sheikh
*Assistant Examiner* — Mary I Omori
(74) *Attorney, Agent, or Firm* — Burr & Brown, PLLC (57) ABSTRACT

A plugged honeycomb structure, including: a pillar-shaped honeycomb structure body including porous partition walls; and plugging portions disposed at open ends of cells at an inflow end face side or at an outflow end face side, wherein a pore diameter corresponding to the cumulative pore volume of 10% is D10, a pore diameter corresponding to the cumulative pore volume of 30% is D30, a pore diameter corresponding to the cumulative pore volume of 50% is D50, a pore diameter corresponding to the cumulative pore volume of 70% is D70, a pore diameter corresponding to the cumulative pore volume of 90% is D90, the pore diameter D10 is 6 μm or more, the pore diameter D90 is 58 μm or less, and the plugged honeycomb structure satisfies the relationship of Expression (1).

$0.35 \leq (D70-D30)/D50 \leq 1.5$      Expression (1):

7 Claims, 3 Drawing Sheets

(51) Int. Cl.
*C04B 38/00* (2006.01)
*C04B 35/478* (2006.01)
*C04B 35/584* (2006.01)
*C04B 35/565* (2006.01)
C04B 111/00 (2006.01)
B01D 46/00 (2006.01)
B01D 53/94 (2006.01)

(52) U.S. Cl.
CPC ........ *C04B 35/584* (2013.01); *C04B 38/0006* (2013.01); *C04B 38/0012* (2013.01); *B01D 46/006* (2013.01); *B01D 53/944* (2013.01); *B01D 2046/2437* (2013.01); *B01D 2046/2481* (2013.01); *B01D 2046/2496* (2013.01); *B01D 2255/9155* (2013.01); *B01D 2279/30* (2013.01); *C04B 2111/0081* (2013.01); *C04B 2111/00793* (2013.01)

(56) References Cited

U.S. PATENT DOCUMENTS

2004/0261384 A1 12/2004 Merkel et al.
2007/0119135 A1* 5/2007 Miao .................. B01D 39/2068 55/523
2010/0234206 A1* 9/2010 Miao .................. B01D 39/2068 501/83
2012/0064286 A1* 3/2012 Hirose ............... B01D 46/2425 428/116
2012/0148792 A1* 6/2012 Okazaki ................ F01N 3/0222 428/116
2015/0360162 A1 12/2015 Okazaki

FOREIGN PATENT DOCUMENTS

| JP | 2004-162544 A | 6/2004 |
| JP | 2007-525612 A | 9/2007 |
| JP | 2010/0103669 A1 | 9/2010 |
| WO | 2010/0103669 A1 | 9/2010 |

OTHER PUBLICATIONS

Japanese Offer of Information Form, Japanese Application No. 2017-048701, dated Jan. 27, 2020 (8 pages).

* cited by examiner

PLUGGED HONEYCOMB STRUCTURE

The present application is an application based on JP-2017-048701 filed on Mar. 14, 2017 with the Japan Patent Office, the entire contents of which are incorporated herein by reference.

BACKGROUND OF THE INVENTION

Field of the Invention

The present invention relates to plugged honeycomb structures. More specifically the present invention relates to a plugged honeycomb structure configured to have excellent trapping performance and capable of suppressing generation of a variation in pressure loss after loading with catalyst for purifying exhaust gas.

Description of the Related Art

Conventionally a plugged honeycomb structure having a honeycomb structure has been known, which is used for a filter to trap particulate matters in exhaust gas emitted from an internal combustion engine, such as a diesel engine, or a device to purify a toxic gas component, such as CO, HC and NOx (see Patent Document 1). A honeycomb structure includes partition walls made of porous ceramics, such as cordierite or silicon carbide, and this partition walls defines a plurality of cells. A plugged honeycomb structure includes such a honeycomb structure provided with plugging portions so as to plug the open ends of the plurality of cells at the inflow end face side and the outflow end face side alternately. In other words, a plugged honeycomb structure has inflow cells that are open at the inflow end face side and are plugged at the outflow end face side and outflow cells that are plugged at the inflow end face side and are open at the outflow end face side, and these inflow cells and outflow cells are disposed alternately via the partition walls. The porous partition walls of this plugged honeycomb structure serves as a filter to trap particulate matters in exhaust gas. Hereinafter the particulate matters in exhaust gas may be called "PMs". "PM" stands for "Particulate Matter".

A plugged honeycomb structure purifies exhaust gas as follows. A plugged honeycomb structure is placed so that its inflow end face side is located at the upstream side of the exhaust system to emit exhaust gas. Then the exhaust gas flows into the inflow cells of the plugged honeycomb structure from the inflow end face side.

The exhaust gas flowing into the inflow cells passes through the porous partition walls toward the outflow cells and then is discharged from the outflow end face of the plugged honeycomb structure. PMs and the like in the exhaust gas are trapped for removal during the passage through the porous partition walls. In the plugged honeycomb structure, pores defined in the partition walls are loaded with catalyst, and the catalyst is for removing a toxic gas component from exhaust gas for purification. The thus configured plugged honeycomb structure can purify the exhaust gas during the passage through the partition walls by removing toxic gas components from the exhaust gas with the catalyst loaded in the pores.

A porous honeycomb filter described in Patent Document 1, for example, is made of a material containing cordierite as the main crystal phase, and the distribution of a pore diameter of the cordierite is controlled as follows. In the technique disclosed by Patent Document 1, the distribution of a pore diameter is controlled so that the volume of the pores having diameters of less than 10 μm is 15% or less of the total pore volume, the volume of pores having diameters of 10 to 50 μm is 75% or more of the total pore volume, and the volume of pores having diameters exceeding 50 μm is 10% or less of the total pore volume.

[Patent Document 1] JP-A-2002-219319

SUMMARY OF THE INVENTION

The plugged honeycomb structure purifies exhaust gas by trapping PMs of the exhaust gas with pores of the partition walls during the passage through the pores. For the distribution of pore diameter of the pores formed in the porous partition walls of such a plugged honeycomb structure, the distribution conventionally considered preferably has a sharp peak shape to effectively suppress an increase of the pressure loss and so improve the trapping efficiency. When a plugged honeycomb structure has partition walls having the distribution of pore diameter that has a sharp peak shape, such a plugged honeycomb structure can have low pressure loss.

Such a plugged honeycomb structure, however, has the drawback that a plurality of manufactured such plugged honeycomb structures each loaded with catalyst for purifying exhaust gas are mutually different in the pressure loss.

That is, when a plugged honeycomb structure including partition walls having the distribution of pore diameters of a sharp peak shape is loaded with catalyst having a specific particle diameter, such a plugged honeycomb structure can have low pressure loss even after loading with the catalyst. If the particle diameter of the catalyst changes slightly because the production lot of the catalyst is changed, for example, the plugged honeycomb structure may have a value of pressure loss that is very different from the value of the plugged honeycomb structure loaded with the previously used catalyst. Probably such a problem results from the sharp peak shape of the distribution of pore diameters. Alternatively the pressure loss of individual plugged honeycomb structures may vary greatly due to a small difference in the loading condition of the catalyst even when the catalyst is in the same production lot.

Recently performed control processing of automobile engines includes regeneration processing of a plugged honeycomb structure. In this processing, the amount of soot trapped with the plugged honeycomb structure is detected, and the soot accumulated internally of the plugged honeycomb structure is burned for removal as needed at the optimum timing. Such engine control processing measures the pressure loss of the plugged honeycomb structure and determines the timing to start the regeneration processing based on the measured pressure loss. In such a case, if a plurality of plugged honeycomb structures manufactured as the same product has a large variation in the pressure loss, a serious problem may occur in the engine control processing. Therefore there is a demand for a plugged honeycomb structure used for a filter to purify exhaust gas that has a small variation in pressure loss after loading with catalyst for purifying the exhaust gas.

In view of such problems of the conventional techniques, the present invention provides a plugged honeycomb structure configured to have excellent trapping performance and capable of suppressing variations in pressure loss after loading with catalyst for purifying exhaust gas.

The present invention provides the following plugged honeycomb structure.

According to a first aspect of the present invention, a plugged honeycomb structure is provided, includes: a pillar-shaped honeycomb structure body having an inflow end face and an outflow end face and including porous partition walls disposed so as to surround a plurality of cells, the plurality of cells extending from the inflow end face to the outflow end face and serving as a through channel of fluid; and plugging portions disposed at open ends of the cells at the inflow end face side or at the outflow end face side, wherein the partition walls have cumulative pore volume measured by mercury porosimetry, a pore diameter corresponding to the cumulative pore volume of 10% of an overall pore volume is D10, a pore diameter corresponding to the cumulative pore volume of 30% of the overall pore volume is D30, a pore diameter corresponding to the cumulative pore volume of 50% of the overall pore volume is D50, a pore diameter corresponding to the cumulative pore volume of 70% of the overall pore volume is D70, a pore diameter corresponding to the cumulative pore volume of 90% of the overall pore volume is D90, the pore diameter D10 is 6 μm or more, the pore diameter D90 is 58 μm or less, and the plugged honeycomb structure satisfies the relationship of Expression (1).

$$0.35 \leq (D70-D30)/50 \leq 1.5 \quad \text{Expression (1):}$$

According to a second aspect of the present invention, the plugged honeycomb structure according to the first aspect is provided, wherein the plugged honeycomb structure satisfies the relationship of Expression (2), $$0.40 \leq (D70-D30)/D50 \leq 1.3 \quad \text{Expression (2):}$$

In Expression (2), D30 denotes the value of the pore diameter D30, D50 denotes the value of the pore diameter D50, and D70 denotes the value of the pore diameter D70.

According to a third aspect of the present invention, the plugged honeycomb structure according to the first or second aspects is provided, wherein the pore diameter D10 is 7 μm or more.

According to a fourth aspect of the present invention, the plugged honeycomb structure according to any one of the first to third aspects is provided, wherein the pore diameter D90 is 52 μm or less.

According to a fifth aspect of the present invention, the plugged honeycomb structure according to any one of the first to third aspects is provided, wherein the partition wall has a thickness of 0.15 to 0.46 mm.

According to a sixth aspect of the present invention, the plugged honeycomb structure according to any one of the first to fifth aspects is provided, wherein the partition walls have porosity of 50 to 70%.

According to a seventh aspect of the present invention, the plugged honeycomb structure according to any one of the first to sixth aspects is provided, wherein the partition walls are loaded with catalyst to purify exhaust gas, and the loading amount of the catalyst is 50 to 300 g/L.

According to an eighth aspect of the present invention, the plugged honeycomb structure according to any one of the first to seventh aspects is provided, wherein the partition walls include at least one type of materials selected from the group consisting of silicon carbide, cordierite, silicon-silicon carbide composite material, cordierite-silicon carbide composite material, silicon nitride, mullite, alumina, and aluminum titanate.

The plugged honeycomb structure of the present invention has excellent trapping performance and is capable of suppressing variations in pressure loss after loading with catalyst for purifying exhaust gas. Specifically the plugged honeycomb structure of the present invention has a distribution of the pore diameter of the partition walls in a specific range of the pore diameters that is close to a rectangle, i.e., a part including the peak value of the distribution of the pore diameter being wide. The distribution of the pore diameter is shown with a graph having the horizontal axis representing the pore diameter and the vertical axis representing a log differential pore volume. This allows the plugged honeycomb structure to have the pores in such a specific range of the pore diameters at a certain ratio, and to have a very small variation in pressure loss after loading with catalyst even when the particle diameter of the catalyst is slightly changed or when the loading condition of the catalyst is slightly different.

Such a plugged honeycomb structure of the present invention enables a more stable exhaust system, and so can minimize adverse effects on the engine control processing of automobiles, for example. Accordingly such a plugged honeycomb structure of the present invention enables precise engine control processing of automobiles based on the pressure loss.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

Figure 1:
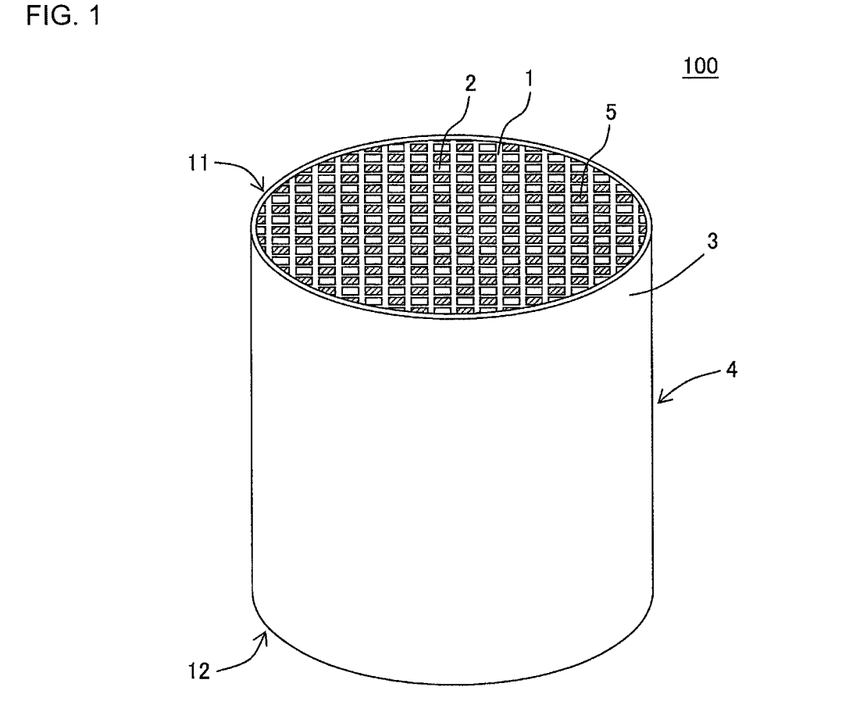
FIG. 1 is a perspective view schematically showing one embodiment of a plugged honeycomb structure of the present invention seen from the inflow end face side.
Figure 2:
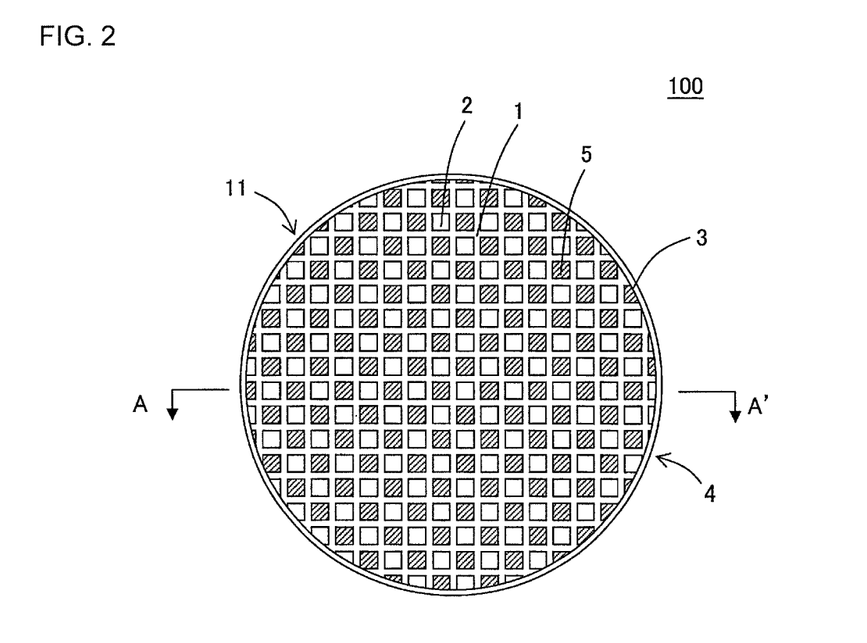
FIG. 2 is a plan view of the plugged honeycomb structure of FIG. 1 seen from the inflow end face side.
Figure 3:
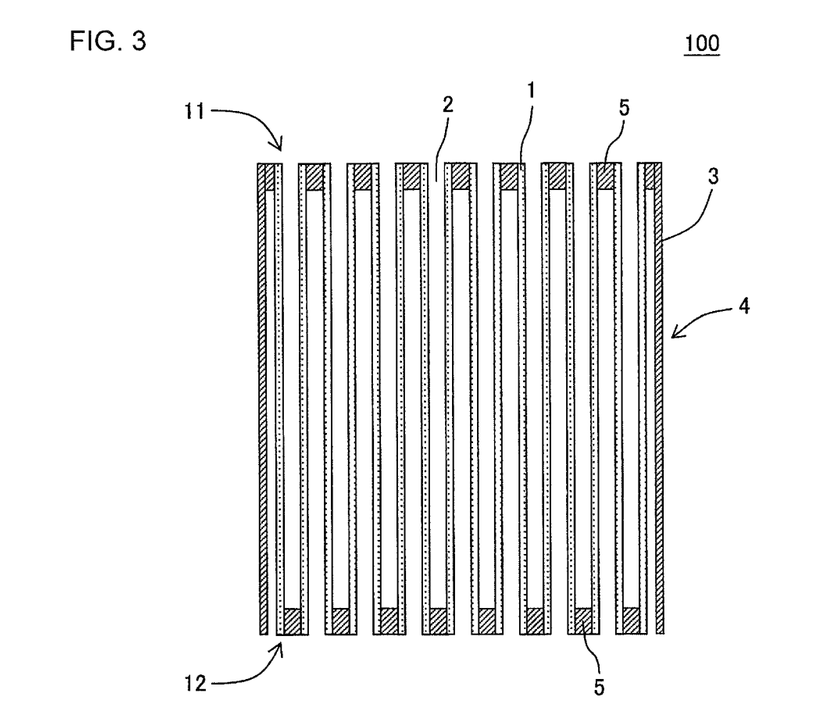
FIG. 3 is a schematic cross-sectional view taken along the line A-A' of FIG. 2.

(1) Plugged Honeycomb Structure:

As shown in FIGS. 1 to 3, a first embodiment of the plugged honeycomb structure of the present invention is a plugged honeycomb structure 100 including a honeycomb structure body 4 and plugging portions 5. The honeycomb structure body 4 is a pillar-shaped body including porous partition walls 1 that surround a plurality of cells 2, and the plurality of cells extends from the inflow end face 11 to the outflow end face 12 of the honeycomb structure body and serves as a through channel of fluid. In the plugged honeycomb structure 100 of the present embodiment, the honeycomb structure body 4 has a round pillar shape, and further includes a circumferential wall 3 at the outer circumferential face. That is, the circumferential wall 3 surrounds the grid-patterned partition walls 1. The plugging portions 5 are disposed at open ends of the cells 2 at the inflow end face 11 side or the outflow end face 12 side.

FIG. 1 is a perspective view schematically showing one embodiment of the plugged honeycomb structure of the present invention viewed from the inflow end face. FIG. 2 is a plan view of the plugged honeycomb structure of FIG. 1 viewed from the inflow end face. FIG. 3 is a schematic cross-sectional view taken along the line A-A' of FIG. 2.

Particularly the plugged honeycomb structure 100 of the present embodiment has a major feature that the cumulative pore volume of the partition walls 1 is as follows. The cumulative pore volume is measured by mercury porosimetry. In the following descriptions, the pore diameter D10 denotes the pore diameter corresponding to the cumulative pore volume of 10%. The pore diameter D30 denotes the pore diameter corresponding to the cumulative pore volume of 30%. The pore diameter D50 denotes the pore diameter corresponding to the cumulative pore volume of 50%. The pore diameter D70 denotes the pore diameter corresponding to the cumulative pore volume of 70%. The pore diameter D90 denotes the pore diameter corresponding to the cumulative pore volume of 90%.

Particularly a major feature of the plugged honeycomb structure 100 of the present embodiment is the pore diameter D10 that is 6 μm or more and the pore diameter D90 that is 58 μm or less. Particularly for another major feature, the plugged honeycomb structure 100 of the present embodiment satisfies the following relationship of Expression (1).

$$0.35 \leq (D70-D30)/D50 \leq 1.5 \qquad \text{Expression (1):}$$

In Expression (1), D30 denotes the value of the pore diameter D30, D50 denotes the value of the pore diameter D50, and D70 denotes the value of the pore diameter D70.

The plugged honeycomb structure 100 of the present embodiment has excellent trapping performance and is capable of suppressing variations in pressure loss after loading with catalyst for purifying exhaust gas. Specifically the plugged honeycomb structure 100 has a distribution of the pore diameter of the partition walls 1 in a specific range of the pore diameters that is close to a rectangle, i.e., a part including the peak value of the distribution of the pore diameter being wide. The distribution of the pore diameter is shown with a graph having the horizontal axis representing the pore diameter and the vertical axis representing a log differential pore volume. This allows the plugged honeycomb structure to have the pores in such a specific range of the pore diameters at a certain ratio, and to have a very small variation in pressure loss after loading with catalyst even when the particle diameter of the catalyst is slightly changed or when the loading condition of the catalyst is slightly different.

Such a plugged honeycomb structure 100 of the present embodiment enables a more stable exhaust system, and so can minimize adverse effects on the engine control processing of automobiles, for example. Accordingly such a plugged honeycomb structure 100 of the present embodiment enables precise engine control processing of automobiles based on the pressure loss.

The cumulative pore volume of the partition walls 1 is a value measured by mercury porosimetry. The cumulative pore volume of the partition walls 1 can be measured by using Autopore 9500 (product name) produced by Micromeritics Co, for example. Specifically the cumulative pore volume of the partition walls 1 can be measured by the following method. Firstly a part of the partition walls 1 is cut out from the plugged honeycomb structure 100 to prepare a test piece for the measurement of the cumulative pore volume. The size of the test piece is not limited especially, which may be a cuboid of about 10 mm, about 10 mm and about 20 mm in length, width and height, for example, preferably. A part of the partition walls 1 to be cut out as the test piece is not limited especially. Preferably the test piece is cut out from a part close to the center in the axial direction of the honeycomb structure body 4. The prepared test piece is placed in a measurement cell of a measurement apparatus, and the pressure in this measurement cell is reduced. Next, mercury is introduced into the measurement cell. Next, the mercury introduced in the measurement cell is pressurized, and the volume of the mercury that enters the pores of the test piece during the pressurization is measured. At this time, as the pressure applied to the mercury increases, the mercury enters pores having a larger pore diameter first and then enters pores having a smaller pore diameter. Thus the relationship between the "pore diameter of the pores formed in the test piece" and the "cumulative pore volume" can be obtained based on the relationship between the "pressure applied to the mercury" and the "volume of the mercury entering the pores". The cumulative pore volume is a value obtained by accumulating the pore volume values from a smallest pore diameter to a certain pore diameter. For example, "the pore diameter corresponding to the cumulative pore volume of 10%" is the pore diameter corresponding to the cumulative value of the pore volume that is 10% of the overall pore volume by accumulating the pore volume values from a smaller pore diameter of all of the pores.

If the pore diameter D10 is less than 6 μm, the pressure loss varies greatly when the plugged honeycomb structure 100 is loaded with catalyst. If the pore diameter D90 exceeds 58 μm, the trapping performance of the plugged honeycomb structure 100 as a filter deteriorates.

The upper limit of the pore diameter D10 is not limited especially. For instance, the upper limit of the pore diameter D10 may be 25 μm. Preferably the pore diameter D10 is 7 μm or more. When the pore diameter D10 is 7 μm or more, the variation of the pressure loss reduces. Preferably the pore diameter D10 is 6 to 25 μm, more preferably 7 to 20 μm, and particularly preferably 8 to 20 μm. With this configuration, the plugged honeycomb structure can have both of the improved trapping performance and the effect of suppressing a variation of the pressure loss.

The lower limit of the pore diameter D90 is not limited especially. For instance, the lower limit of the pore diameter D90 may be 25 μm. Preferably the pore diameter D90 is 52 μin or less. When the pore diameter D90 is 52 μm or less, the plugged honeycomb structure can keep the favorable trapping performance. Preferably the pore diameter D90 is 25 to 58 μm, more preferably 30 to 52 μm, and particularly preferably 30 to 50 μm. With this configuration, the plugged honeycomb structure can have both of the improved trapping performance and the effect of suppressing a variation of the pressure loss.

The plugged honeycomb structure 100 of the present embodiment satisfying the above Expression (1) can have a distribution of the pore diameter of the partition walls 1 in a specific range of the pore diameters that is close to a rectangle. The distribution of the pore diameter is shown with a graph having the horizontal axis representing the pore diameter and the vertical axis representing a log differential pore volume. This allows the plugged honeycomb structure to have a very small variation in pressure loss after loading with catalyst.

Figure 5:
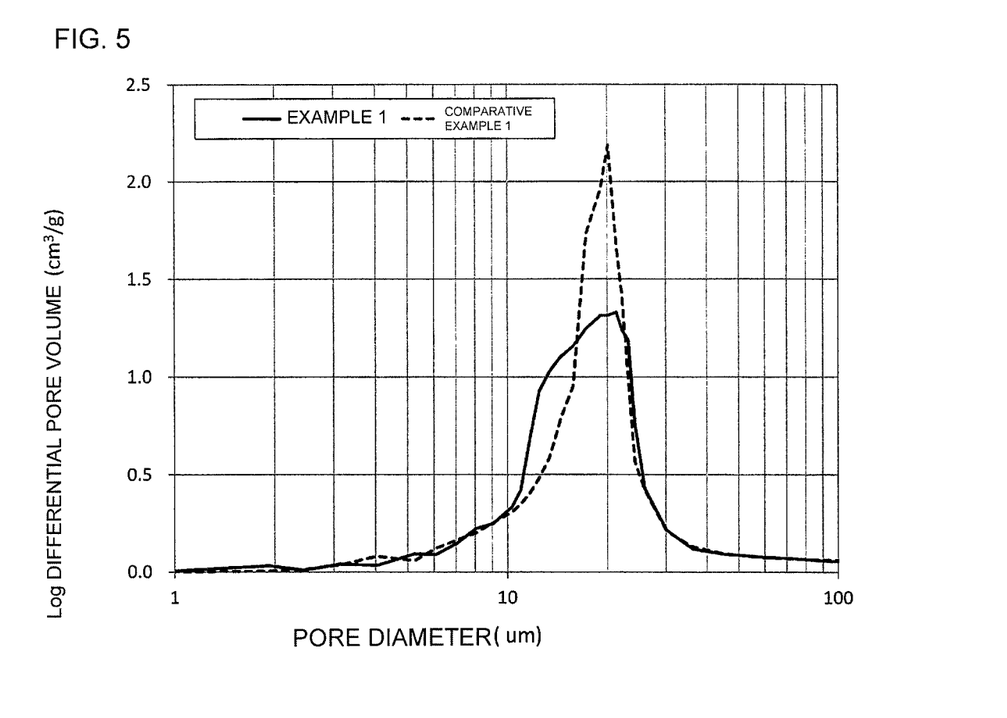
FIG. 5 is a graph showing the distribution of pore diameters of the plugged honeycomb structures of Example 1 and Comparative Example 1.

The "distribution of the pore diameter of the partition walls 1 having the horizontal axis representing the pore diameter and the vertical axis representing the log differential pore volume" can be shown with a graph having the horizontal axis representing the pore diameter (unit: μm) and the vertical axis representing the log differential pore volume (unit: cm³/g), for example. FIG. 5 is an example of such a graph. FIG. 5 is a graph showing the pore volume of the partition walls in the plugged honeycomb structure that is manufactured in the below-described examples. Specifically FIG. 5 is a graph showing the distribution of the pore diameter of the plugged honeycomb structures of Example 1 and Comparative Example 1.

For instance, the distribution of the pore diameter of the plugged honeycomb structure of Example 1 indicated with a solid line in FIG. 5 shows a wide shape at a part including the peak value of the distribution in the range of the pore diameters from above 10 μm to above 20 μm. This allows the plugged honeycomb structure of Example 1 to have a very small variation in pressure loss after loading with catalyst even when the particle diameter of catalyst slightly changes or the loading condition of the catalyst is slightly different.

The following is a description on the graph as shown in FIG. 5 about the log differential pore volume. The graph of FIG. 5 represents the relationship between "log differential pore volume" and "pore diameter". The pore diameter may be called a diameter of the pores. In the mercury porosimetry, mercury is introduced into pores of a sample in the vessel that is tightly sealed to keep a vacuum state by applying pressure to the mercury. As the pressure increases gradually, then the mercury is introduced sequentially to a larger pore first and then to a small pore. Based on the pressure and the amount of introduced mercury, the "pore diameters of the pores formed in the sample (i.e., the diameter of the pores) and the volume of the pores can be calculated. In the following, pore diameters D1, D2, D3 . . . have the relationship of D1>D2>D3 . . . . The average pore diameter D between these measurement points (e.g., between D1 and D2) can be shown on the horizontal axis as the "average pore diameter D=(D1+D2)/2". The log differential pore volume on the vertical axis can be obtained by dividing an increase dV of the pore volume between the measurement points by a logarithmic difference between the pore diameters (i.e., log(D1)−log(D2)). In such a graph representing the relationship between the log differential pore volume and the pore diameter, the point at the local maximum of the log differential pore volume is called a "peak".

In Expression (1), the value of "(D70−D30)/D50" has the lower limit of 0.35. If the value of "(D70−D30)/D50" is less than 0.35, the graph of the pore-diameter distribution is sharp, and so the pressure loss after loading with catalyst varies largely. Preferably the lower limit of "(D70−D30)/D50" is 0.40.

In Expression (1), the value of "(D70−D30)/D50" has the upper limit of 1.5. If the value of "(D70−D30)/D50" exceeds 1.5, the graph of the pore-diameter distribution is too wide, and so the amount of effective pores to transmit gas decreases. As a result, the pressure loss after loading with catalyst varies largely. Preferably the upper limit of "(D70−D30)/D50" is 1.3. From the above, the plugged honeycomb structure of the present embodiment more preferably satisfies the relationship of the following Expression (2).

$$0.40 \leq (D70-D30)/D50 \leq 1.3 \quad \text{Expression (2):}$$

In Expression (2), D30 denotes the value of the pore diameter D30, D50 denotes the value of the pore diameter D50, and D70 denotes the value of the pore diameter D70.

Preferably the pore diameter D50 is 10 to 30 μm, more preferably 12 to 28 μm, and particularly preferably 15 to 25 μm. With this configuration, the plugged honeycomb structure can have both of more improved trapping performance and the effect of suppressing a variation of the pressure loss more.

In the plugged honeycomb structure 100 shown in FIGS. 1 to 3, the partition wall 1 preferably has a thickness of 0.12 to 0.50 mm, more preferably 0.15 to 0.46 mm, and particularly preferably 0.25 to 0.40 mm. The thickness of the partition wall 1 can be measured with a scanning electron microscope or a microscope, for example. If the thickness of the partition wall 1 is less than 0.12 mm, the strength of the plugged honeycomb structure may be not enough. If the thickness of the partition wall 1 exceeds 0.50 mm, when the partition walls 1 are loaded with catalyst, an increasing rate of the pressure loss after loading with the catalyst may increase. For instance, when catalyst is loaded at the partition walls 1, the catalyst is introduced into the interior of the pores of the partition walls 1 by sucking slurry including the catalyst. If the partition wall 1 is too thick, it is difficult to achieve a sufficient suction force. In that case, the catalyst will be concentrated to a part close to the surface of the partition walls 1, and so an increasing ratio of the pressure loss may be large.

In the plugged honeycomb structure 100, the partition walls 1 preferably have porosity of 30 to 75%, more preferably 50 to 70% and particularly preferably 55 to 65%. The porosity of the partition walls 1 is a value measured by mercury porosimetry. The porosity of the partition walls 1 can be measured using Autopore 9500 (product name) produced by Micromeritics Co, for example. To measure the porosity, a part of the partition walls 1 may be cut out from the plugged honeycomb structure 100 to prepare a test piece for the measurement. If the porosity of the partition walls 1 is less than 30%, the pressure loss of the plugged honeycomb structure 100 may increase or the pressure loss after loading with catalyst may vary largely. If the porosity of the partition walls 1 exceeds 75%, the strength of the plugged honeycomb structure 100 as a filter may deteriorate.

Preferably the partition walls 1 are made of at least one type of materials selected from the group consisting of silicon carbide, cordierite, silicon-silicon carbide composite material, cordierite-silicon carbide composite material, silicon nitride, mullite, alumina, and aluminum titanate. The material of the partition walls 1 preferably includes the materials as stated above accounting for 30 mass % or more, more preferably 40 mass % or more, and particularly preferably 50 mass % or more. The silicon-silicon carbide composite material is a composite material including silicon carbide as the aggregate and silicon as the binder. The cordierite-silicon carbide composite material is a composite material including silicon carbide as the aggregate and cordierite as the binder. In the plugged honeycomb structure 100 of the present embodiment, particularly preferable materials of the partition walls 1 are a silicon-silicon carbide composite material and a cordierite-silicon carbide composite material.

The shape of the cells 2 in the honeycomb structure body 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, or an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. In the present invention, cells refer to a space surrounded with the partition walls.

Preferably the cells 2 defined by the partition walls 1 have cell density that is 15 to 70 cells/cm$^2$, and 30 to 65 cells/cm$^2$ more preferably. The thus configured plugged honeycomb structure 100 of the present embodiment can be preferably used as a filter to purify exhaust gas emitted from an automobile engine.

The circumferential wall 3 of the honeycomb structure body 4 may be monolithic with the partition walls 1 or may be a circumference coating layer that is formed by applying a circumference coating material so as to surround the partition walls 1. Although not illustrated, during the manufacturing process, the partition walls and the circumferential wall may be formed in a monolithic manner, and then the circumferential wall formed may be removed by a known method, such as grinding. Then, the circumference coating layer may be disposed at the circumference of the partition walls.

The shape of the honeycomb structure body 4 is not limited especially. Examples of the shape of the honeycomb structure body 4 include a pillar shape in which the inflow end face 11 and the outflow end face 12 have a shape, such as a circle, an ellipse, or a polygon.

The size of the honeycomb structure body 4, including, for example, the length from the inflow end face 11 to the outflow end face 12 and the size of a cross section orthogonal to the extending direction of the cells 2 of the honeycomb structure body 4, is not limited especially. The size of the plugged honeycomb structure 100 of the present embodiment may be selected appropriately so that it can have the optimum ability for purification when it is used as a filter to purify exhaust gas. For instance, the length from the inflow end face 11 to the outflow end face 12 of the honeycomb structure body 4 is preferably 80 to 500 mm, more preferably 90 to 400 mm, and particularly preferably 100 to 300 mm. The area of a cross section orthogonal to the extending direction of the cells 2 of the honeycomb structure body 4 is preferably 780 to 73000 mm$^2$, more preferably 10000 to 60000 mm$^2$ and particularly preferably 12000 to 50000 mm$^2$.

The plugged honeycomb structure 100 of the present embodiment includes the plugging portions 5 disposed at open ends of predetermined cells 2 at the inflow end face 11 side and at open ends of the residual cells 2 at the outflow end face 12 side. Inflow cells are the cells 2 having the plugging portions 5 at the open ends of the outflow end face 12 side and that are open at the inflow end face 11 side. Outflow cells are the cells 2 having the plugging portions 5 at the open ends of the inflow end face 11 side and that are open at the outflow end face 12 side. Preferably the inflow cells and the outflow cells are arranged alternately via the partition walls 1. Thereby, a checkerboard pattern is preferably formed with the "plugging portions 5" and the "open ends of the cells 2" at each of the end faces of the plugged honeycomb structure 100.

The plugging portions 5 preferably are made of a material that is a preferable material of the partition walls 1. The plugging portions 5 and the partition walls 1 may be made of the same material or of different materials.

In the plugged honeycomb structure 100 of the present embodiment, the partition walls 1 defining the plurality of cells 2 may be loaded with catalyst. The partition walls 1 being loaded with catalyst refer to coating of the catalyst at the surface of the partition walls 1 and at the inner walls of the pores formed in the partition walls 1. The thus configured plugged honeycomb structure can convert CO, NOx, HC or the like in the exhaust gas into harmless substances through the catalytic reaction. This also can promote the oxidization of the trapped PMs, such as soot.

The catalyst used in the plugged honeycomb structure 100 of the present embodiment is not limited especially. The catalyst preferably includes one type or more selected from the group consisting of SCR catalyst, NOx absorber catalyst, and oxidation catalyst. SCR catalyst selects a component to be purified for reduction. Especially NOx selective reduction SCR catalyst is preferably used as the SCR catalyst, which selects NOx in exhaust gas for reduction. Examples of the SCR catalyst include metal-substituted zeolite. Examples of metals for metal substitution of zeolite include iron (Fe) and copper (Cu). Preferable examples of zeolite include beta zeolite. SCR catalyst may be a catalyst including, as a major component, at least one type selected from the group consisting of vanadium and titania. Examples of the NOx absorber catalyst include alkali metals and alkali earth metals. Examples of the alkali metals include potassium, sodium, and lithium. Examples of the alkali earth metals include calcium. Examples of the oxidation catalyst include one containing noble metals. Specifically, oxidation catalyst preferably may be a catalyst including at least one type selected from the group consisting of platinum, palladium and rhodium.

The loading amount of the catalyst loaded at the partition walls 1 of the honeycomb structure body 4 per unit volume may be determined appropriately depending on the type of the catalyst used. For instance, when SCR catalyst is used, the loading amount of such catalyst is preferably 50 to 300 g/L, and 50 g to 250 g/L more preferably. The loading amount of the catalyst is the amount (g) of the catalyst that is loaded per unit volume (L) of the honeycomb structure body 4. In one example of the method for loading the catalyst, catalyst solution containing a catalyst component is wash-coated on the honeycomb structure body 4, followed by heat treatment at high temperatures for burning.

Figure 4:
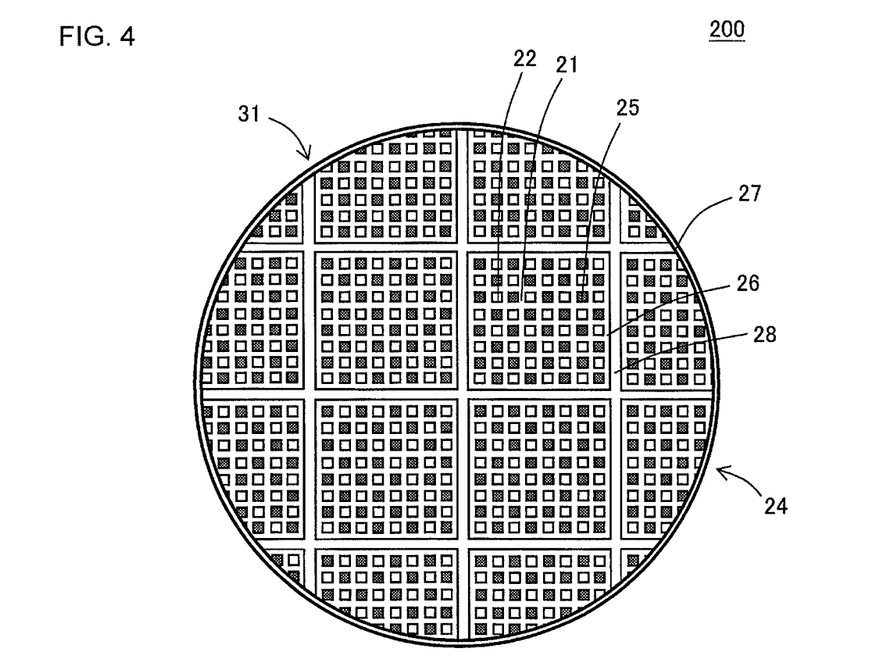
FIG. 4 is a plan view schematically showing another embodiment of a plugged honeycomb structure of the present invention seen from the inflow end face side.

The plugged honeycomb structure of the present invention may be a segmented-structured plugged honeycomb structure as shown in FIG. 4. FIG. 4 is a plan view schematically showing another embodiment of a plugged honeycomb structure of the present invention seen from the inflow end face side.

As shown in FIG. 4, the plugged honeycomb structure 200 includes a pillar-shaped honeycomb structure body 24, a segment circumferential wall 27 and plugging portions 25. In the plugged honeycomb structure 200, the honeycomb structure body 24 has a segmented structure including a plurality of honeycomb segments 26 and a bonding layer 28.

As shown in FIG. 4, the honeycomb segment 26 has a pillar-shaped body including porous partition walls 21 arranged to surround a plurality of cells 22, and the plurality of cells serves as a through channel of fluid. The plugging portions 25 are disposed at any one of the open ends of each of the plurality of cells 22 formed in the honeycomb segment 26 so as to plug each of the cells 22 at any one of the open ends. The plugged honeycomb structure 200 has a cumulative pore volume at the partition walls 21 of each honeycomb segment 26 such that the pore diameter D10 is 6 μm or more and the pore diameter D90 is 58 μm or less. Each of the honeycomb segments 26 of the plugged honeycomb structure 200 satisfies the above relationship of Expression (1).

(2) Method for Manufacturing Plugged Honeycomb Structure:

There is no particular limitation on the method for manufacturing the plugged honeycomb structures of the present embodiment shown in FIGS. 1 to 3, and they can be manufactured by the following method, for example. Firstly a plastic kneaded material is prepared to produce a honeycomb structure body. The kneaded material to produce a honeycomb structure body can be prepared by adding additives, such as binder, pore former and water as needed to a material selected as raw material powder from the aforementioned materials suitable for the honeycomb structure body. As the raw material powder, silicon carbide powder and metal silicon powder may be mixed for use, for example. Examples of the binder include methylcellulose and hydroxypropyl methylcellulose. Examples of the additives include surfactant. The porosity and the distribution of pore diameter of the partition walls can be controlled by adjusting the additive amount of the pore former.

Next, the thus prepared kneaded material is extruded, thus producing a honeycomb formed body having partition walls defining a plurality of cells and an outer wall surrounding this partition walls.

The thus obtained honeycomb formed body is dried by microwaves and hot air, for example, and then open ends of the cells are plugged with a material similar to the material used for the honeycomb formed body, thus producing plugging portions. After forming the plugging portions, the honeycomb formed body may be dried again.

Next the honeycomb formed body including the prepared plugging portions is fired, so as to obtain a plugged honeycomb structure. A firing temperature and a firing atmosphere vary with the raw material, and the person skilled in the art can select the firing temperature and the firing atmosphere that are the most suitable for the selected material.

EXAMPLES

The following describes the present invention more specifically by way of examples, and the present invention is by no means limited to these examples.

Example 1

As the raw material powder to prepare kneaded material, silicon carbide (SiC) powder and metal silicon (Si) powder were mixed at the mass ratio of 80:20 to prepare a mixed raw material.

7 parts by mass of binder, 25 parts by mass of pore former, and 42 parts by mass of water were added to 100 parts by mass of this mixed raw material to produce a forming raw material to prepare a kneaded material. Methylcellulose was used as the binder. For the pore former, pore former A having a particle diameter, which has the average pore diameter of 21 μm after firing, and pore former B having a particle diameter, which has the average pore diameter of 17 μm after firing, were blended at 1:1.

Next, the obtained forming raw material was kneaded by a kneader, thus preparing a kneaded material. Next, the obtained kneaded material was formed using an extruder to produce sixteen honeycomb formed bodies each having a quadrangular-prism shape. Next the obtained honeycomb formed bodies were heated and dried by high-frequency induction heating, followed by drying again by a hot-air drier.

Next, plugging portions were formed at the dried honeycomb formed bodies. Firstly a mask was applied to the inflow end face of the honeycomb formed body. Next the masked end part (the end part on the inflow end face side) was immersed in slurry for plugging to fill the open ends of the cells without the mask (outflow cells) with the slurry for plugging. In this way, plugging portions were formed at the inflow end face side of the honeycomb formed body. Then, plugging portions were formed at the inflow cells as well similarly at the outflow end face of the dried honeycomb formed body.

Then the honeycomb formed body having the plugging portions formed was degreased and fired. In this way, sixteen honeycomb fired bodies having a quadrangular-prism shape were produced. Degreasing was performed at 550° C. for 3 hours, and firing was performed at 1,450° C. for 2 hours in an argon atmosphere. The thus obtained sixteen honeycomb fired bodies were honeycomb segments to manufacture a plugged honeycomb structure.

Each honeycomb segment had a quadrangular-prism shape that was a quadrangle at the end face, and the quadrangle had the length of 42 mm in one side. The honeycomb segment had the length in the cell-extending direction of 140 mm. The partition wall of the honeycomb segment had the thickness of 0.305 mm. The cells defined by the partition walls had a quadrangular shape. The honeycomb segment had the cell density of 46.5 cells/cm$^2$.

Next, the thus obtained sixteen honeycomb segments were disposed so that their lateral faces were opposed mutually, and were bonded with a bonding material, so as to manufacture a honeycomb bonded body. The honeycomb bonded body was manufactured by bonding the sixteen honeycomb segments in total so that the honeycomb segments were disposed at their end faces four in rows and four in columns.

Next the circumferential part of the honeycomb bonded body was ground and processed so that the honeycomb bonded member was circular in the cross section perpendicular to the extending direction of the cells. Subsequently, a circumference coating material including a ceramic raw material was applied to the outermost circumference of the ground and processed honeycomb bonded body.

The honeycomb bonded body with the circumference coating material applied thereto was treated with heat at 600° C., so as to manufacture a plugged honeycomb structure of Example 1. The plugged honeycomb structure of Example 1 included a honeycomb structure body made up of the honeycomb bonded body, the segment circumferential wall made of the circumference coating material and the plugging portions to plug any one of the cells.

The plugged honeycomb structure of Example 1 had the diameter at their end faces of 165 mm and the length in the cell-extending direction of 140 mm. The bonding layer to bond the honeycomb segments had the thickness of 1 mm. The segment circumferential wall had the thickness of 1 mm.

For the plugged honeycomb structure of Example 1, the porosity and the cumulative pore volume of the partition walls were measured by the following method. Based on the measurement result of the cumulative pore volume, the pore diameter D10, the pore diameter D30, the pore diameter D50, the pore diameter D70 and the pore diameter D90 were obtained. Table 1 shows the result.

TABLE 1

|  | porosity (%) | partition-wall thickness (mm) | pore diameter obtained from cumulative pore volume (μm) | | | | | (D70-D30)/ D50 |
|---|---|---|---|---|---|---|---|---|
|  |  |  | D10 | D30 | D50 | D70 | D90 |  |
| Ex. 1 | 63 | 0.305 | 10.1 | 14.7 | 18.5 | 22.6 | 45.2 | 0.427 |
| Ex. 2 | 63 | 0.305 | 12.9 | 17.4 | 21.8 | 25.1 | 48.5 | 0.353 |
| Ex. 3 | 63 | 0.305 | 7.5 | 11.9 | 20.5 | 34.2 | 52.8 | 1.088 |
| Ex. 4 | 63 | 0.305 | 6.0 | 8.2 | 19.4 | 37.3 | 57.9 | 1.500 |
| Ex. 5 | 63 | 0.305 | 6.2 | 12.4 | 15.1 | 18.0 | 39.6 | 0.371 |
| Comp. Ex. 1 | 63 | 0.305 | 9.9 | 16.4 | 19.2 | 22.3 | 45.2 | 0.307 |
| Comp. Ex. 2 | 63 | 0.305 | 8.5 | 13.8 | 16.9 | 19.5 | 39.9 | 0.337 |
| Comp. Ex. 3 | 63 | 0.305 | 7.1 | 9.2 | 20.0 | 42.5 | 56.8 | 1.665 |
| Comp. Ex. 4 | 63 | 0.305 | 16.5 | 21.5 | 27 | 31.2 | 58.5 | 0.359 |
| Comp. Ex. 5 | 63 | 0.305 | 5.3 | 12.3 | 15.2 | 18.2 | 40.1 | 0.388 |
| Ex. 6 | 52 | 0.305 | 12.1 | 18.0 | 21.3 | 25.5 | 52.1 | 0.352 |
| Ex. 7 | 52 | 0.305 | 9.8 | 15.8 | 18.0 | 22.7 | 48.8 | 0.383 |
| Comp. Ex. 6 | 52 | 0.305 | 12.7 | 17.8 | 20.1 | 22.4 | 33.6 | 0.229 |
| Comp. Ex. 7 | 52 | 0.305 | 9.5 | 14.4 | 16.8 | 19.2 | 31.9 | 0.286 |

(Porosity)

The porosity of the partition walls was measured using Autopore 9500 (product name) produced by Micromeritics Co. To measure the porosity, a part of the partition walls was cut out from the plugged honeycomb structure to prepare a test piece, and the porosity of the obtained test piece was measured. The test piece was a cuboid of about 10 mm, about 10 mm and about 20 mm in length, width and height. The test piece was taken from the honeycomb segment disposed close to the center in the axial direction of the honeycomb structure body.

(Cumulative Pore Volume)

The cumulative pore volume of the partition walls was measured using Autopore 9500 (product name) produced by Micromeritics Co. The cumulative pore volume also was measured using the same test piece as in the measurement of the porosity.

Based on the measurement result of the cumulative pore volume, the pore diameter D10, the pore diameter D30, the pore diameter D50, the pore diameter D70 and the pore diameter D90 were obtained. The result is shown in the fields of "D10", "D30", "D50", "D70" and "D90" of the "pore diameter obtained from the cumulative pore volume" in Table 1. Based on these results, the value of "(D70–D30)/ D50" was obtained. Table 1 shows the result.

The plugged honeycomb structure of Example 1 had the porosity of the partition walls that was 63%.

The pore diameter D10 corresponding to the cumulative pore volume of 10% was 10.1 μm.

The pore diameter D30 corresponding to the cumulative pore volume of 30% was 14.7 μm.

The pore diameter D50 corresponding to the cumulative pore volume of 50% was 18.5

The pore diameter D70 corresponding to the cumulative pore volume of 70% was 22.6 μm.

The pore diameter D90 corresponding to the cumulative pore volume of 90% was 45.2 μm.

Based on the measurement result of the cumulative pore volume, a graph showing the distribution of the pore diameter of the plugged honeycomb structure was created as in FIG. 5. In this graph, the horizontal axis represents the pore diameter and the vertical axis represents the log differential pore volume.

Catalyst was loaded at the partition walls of the plugged honeycomb structure of Example 1 by the following method. Firstly catalyst slurry containing Cu zeolite was prepared. This catalyst slurry was loaded at the plugged honeycomb structure so that the loading amount per unit volume after drying was 120 g/L. To load the catalyst, the plugged honeycomb structure was dipped into the catalyst slurry for impregnation, followed by air-blowing to blow off the extra catalyst slurry. This was dried at the temperature of 120° C., followed by heat treatment at 500° C. for 3 hours, whereby a plugged honeycomb structure loaded with the catalyst was obtained. The loading amount of the catalyst at the plugged honeycomb structure of Example 1 was 120 g/L. Table 2 shows the loading amount of the catalyst at the plugged honeycomb structure.

For the plugged honeycomb structure of Example 1 loaded with the catalyst in this way, the "variation ratio of pressure loss (%)" and "the number of exhausted PMs ($\times 10^{11}$ pieces/km)" were measured by the following method. Table 2 shows the result.

TABLE 2

|  | loading amount of catalyst (g/L) | variation ratio of pressure loss (%) | the number of exhausted PMs ($\times 10^{11}$ pieces/km) |
|---|---|---|---|
| Ex. 1 | 120 | 15% | 0.75 |
| Ex. 2 | 120 | 19% | 1.5 |
| Ex. 3 | 120 | 11% | 2.2 |
| Ex. 4 | 120 | 18% | 5.7 |
| Ex. 5 | 120 | 17% | 0.12 |
| Comp. Ex. 1 | 120 | 30% | 0.45 |
| Comp. Ex. 2 | 120 | 22% | 0.1 |
| Comp. Ex. 3 | 120 | 23% | 4.5 |
| Comp. Ex. 4 | 120 | 18% | 6.5 |
| Comp. Ex. 5 | 120 | 23% | 0.15 |
| Ex. 6 | 50 | 18% | 2.3 |
| Ex. 7 | 50 | 16% | 1.3 |
| Comp. Ex. 6 | 50 | 40% | 0.05 |
| Comp. Ex. 7 | 50 | 32% | 0.02 |

(Variation Ratio of Pressure Loss (%))

Firstly twenty plugged honeycomb structures were manufactured for each of the Examples by the same method, and catalyst was loaded at these plugged honeycomb structures by the same method. Next, air at room temperatures was allowed to flow through these plugged honeycomb structures at the flow rate of 10 m³/min., and the pressure at the inflow end face side and at the outflow end face side was measured for these plugged honeycomb structures. Then a difference in pressure between the inflow end face side and the outflow end face side was calculated to obtain the pressure loss (kPa) of these plugged honeycomb structures. The value $P_1$ of pressure loss of the plugged honeycomb structure having the largest pressure loss, the value $P_2$ of pressure loss of the plugged honeycomb structure having the smallest pressure loss, and the average value $P_0$ of pressure loss of the twenty plugged honeycomb structures were obtained, and the "variation ratio of pressure loss (%)" was obtained based on the following Expression (3). For the measurement of this "variation ratio of pressure loss (%)", when their variation ratio of pressure loss was 20% or less, such plugged honeycomb structures were acceptable, and when their variation ratio of pressure loss exceeded 20%, such plugged honeycomb structures were rejected.

Variation ratio of pressure loss=$(P_1-P_2)/(2\times P_0)\times 100\%$ Expression (3):

In Expression (3), $P_1$ denotes the value of pressure loss of the plugged honeycomb structure having the largest pressure loss. In Expression (3), $P_2$ denotes the value of pressure loss of the plugged honeycomb structure having the smallest pressure loss. In Expression (3), $P_0$ denotes the average value of pressure loss of the twenty plugged honeycomb structures.

(The Number of Exhausted PMs ($\times 10^{11}$ Pieces/km)])

Firstly an apparatus to purify exhaust gas including a plugged honeycomb structure as a filter was manufactured. At an upstream side of the plugged honeycomb structure of the apparatus to purify exhaust gas, a purifying member A loaded with diesel oxidation catalyst (DOC) was placed. At a downstream side of the plugged honeycomb structure of the apparatus to purify exhaust gas, a purifying member B loaded with selective catalytic reduction (SCR) was placed. Such an apparatus to purify exhaust gas was attached at the CC position of the vehicle mounted with a 3.0-L diesel engine, and the number of exhausted particulate matters (PMs) was measured in accordance with the procedure of EURO6 in Europe to regulate the number of exhausted particulates (PN regulation). "PN" stands for "Particulate Number". "PM" stands for "Particulate Matter". For the measurement of this "number of exhausted PMs ($\times 10^{11}$ pieces/km)", when the number was $6\times 10^{11}$ pieces/km or less, such a plugged honeycomb structure was acceptable, and when the number exceeded $6\times 10^{11}$ pieces/km, such a plugged honeycomb structure was rejected.

Examples 2 to 7

As shown in Table 1, plugged honeycomb structures were manufactured while changing their porosity and pore diameter obtained from the cumulative pore volume. The porosity and the pore diameter (i.e., the cumulative pore volume) were controlled by adjusting the particle diameter and the amount of the pore former added to the forming raw material.

In Example 2, for the pore former, pore former C having a particle diameter, which has the average pore diameter of 23 µm after firing, and pore former A having a particle diameter, which has the average pore diameter of 21 µm after firing, were blended at 1:1.

In Example 3, for the pore former, pore former D having a particle diameter, which has the average pore diameter of 27 µm after firing, and pore former E having a particle diameter, which has the average pore diameter of 16 µm after firing, were blended at 1:1.

In Example 4, for the pore former, pore former F having a particle diameter, which has the average pore diameter of 28 µm after firing, pore former A having a particle diameter, which has the average pore diameter of 21 µM after firing, and pore former G having a particle diameter, which has the average pore diameter of 14 µm after firing were blended at 1:1:1.

In Example 5, for the pore former, pore former B having a particle diameter, which has the average pore diameter of 17 µm after firing, and pore former G having a particle diameter, which has the average pore diameter of 14 µm after firing, were blended at 1:1.

In Example 6, for the pore former, pore former C having a particle diameter, which has the average pore diameter of 23 µm after firing, and pore former H having a particle diameter, which has the average pore diameter of 20 µm after firing, were blended at 1:1.

In Example 7, for the pore former, pore former H having a particle diameter, which has the average pore diameter of 20 µm after firing, and pore former B having a particle diameter, which has the average pore diameter of 17 µm after firing, were blended at 1:1.

Examples 8 to 13

As shown in Table 3, the plugged honeycomb structures of these Examples were manufactured similarly to Example 1 other than that the thickness of the partition walls was changed.

Examples 14 to 16

As shown in Table 5, plugged honeycomb structures of these Examples were manufactured while changing their porosity and pore diameter obtained from the cumulative pore volume. The porosity and the pore diameter (i.e., the cumulative pore volume) were controlled by adjusting the particle diameter and the amount of the pore former added to the forming raw material.

In Example 14, for the pore former, pore former A having a particle diameter, which has the average pore diameter of 21 µm after firing, and pore former B having a particle diameter, which has the average pore diameter of 17 µm after firing, were blended at 1:1.

In Example 15, for the pore former, pore former A having a particle diameter, which has the average pore diameter of 21 µm after firing, and pore former E having a particle diameter, which has the average pore diameter of 16 µm after firing, were blended at 1:1.

In Example 16, for the pore former, pore former I having a particle diameter, which has the average pore diameter of 24 µm after firing, and pore former J having a particle diameter, which has the average pore diameter of 19 µm after firing, were blended at 1:1.

Comparative Examples 1 to 7

As shown in Table 1, plugged honeycomb structures of these Comparative Examples were manufactured while changing their porosity and pore diameter obtained from the cumulative pore volume. The porosity and the pore diameter (i.e., the cumulative pore volume) were controlled by adjusting the particle diameter and the amount of the pore former added to the forming raw material.

For the plugged honeycomb structures of Examples 2 to 7 and Comparative Examples 1 to 7 loaded with the catalyst having the amount as shown in the fields of the "loading amount of catalyst" in Table 2, the "variation ratio of pressure loss (%)" and "the number of exhausted PMs ($\times 10^{11}$ pieces/km)" were measured by a method similar to Example 1. Table 2 shows the result.

For the plugged honeycomb structures of Examples 1, 6 and 8 to 16, their "pressure loss" and the "compressive strength" were measured by the following methods. Then, the ratio of these measured values of the "pressure loss" and the "compressive strength" relative to the values of the plugged honeycomb structure of Example 1 was calculated while setting the measurement values of the plugged honeycomb structure of Example 1 at 100%. Tables 4 and 6 show the result.

(Pressure Loss)

Firstly, air at room temperatures was allowed to flow through the plugged honeycomb structures of these Examples at the flow rate of 10 m³/min., and the pressure at the inflow end face side and at the outflow end face side was measured for these plugged honeycomb structures. Then a difference in pressure between the inflow end face side and the outflow end face side was calculated to obtain the pressure loss (kPa) of these plugged honeycomb structures. Pressure loss was measured with the plugged honeycomb structures without catalyst loaded.

(Compressive Strength)

A test piece of 25.4 mm in diameter and 25.4 mm in length was hollowed out in the direction parallel to the through channel of the honeycomb structure to prepare a test piece to measure the compressive strength. Load of 1 mm/min. was applied using the compressive tester to the prepared test piece in the through channel direction, and the load F was measured when the test piece was broken. For the tester of the compressive test, INSTRON4206 (product name) was used. By dividing the measured load F by the cross-sectional area P (=506 mm²) of the test piece, the compressive strength of the honeycomb structure was obtained.

TABLE 3

|  | porosity (%) | partition-wall thickness (mm) | pore diameter obtained from cumulative pore volume (μm) | | | | | (D70-D30)/D50 |
|---|---|---|---|---|---|---|---|---|
|  |  |  | D10 | D30 | D50 | D70 | D90 |  |
| Ex. 8 | 63 | 0.470 | 10.1 | 14.7 | 18.5 | 22.6 | 45.2 | 0.427 |
| Ex. 9 | 63 | 0.460 | 10.1 | 14.7 | 18.5 | 22.6 | 45.2 | 0.427 |
| Ex. 10 | 63 | 0.400 | 10.1 | 14.7 | 18.5 | 22.6 | 45.2 | 0.427 |
| Ex. 1 | 63 | 0.305 | 10.1 | 14.7 | 18.5 | 22.6 | 45.2 | 0.427 |
| Ex. 11 | 63 | 0.200 | 10.1 | 14.7 | 18.5 | 22.6 | 45.2 | 0.427 |
| Ex. 12 | 63 | 0.150 | 10.1 | 14.7 | 18.5 | 22.6 | 45.2 | 0.427 |
| Ex. 13 | 63 | 0.130 | 10.1 | 14.7 | 18.5 | 22.6 | 45.2 | 0.427 |

TABLE 4

|  | pressure loss (not coated with catalyst) | compressive strength (not coated with catalyst) |
|---|---|---|
| Ex. 8 | 201% | 148% |
| Ex. 9 | 192% | 143% |
| Ex. 10 | 147% | 127% |
| Ex. 1 | 100% | 100% |
| Ex. 11 | 67% | 73% |
| Ex. 12 | 56% | 58% |
| Ex. 13 | 51% | 48% |

TABLE 5

|  | porosity (%) | partition-wall thickness (mm) | pore diameter obtained from cumulative pore volume (μm) | | | | | (D70-D30/D50 |
|---|---|---|---|---|---|---|---|---|
|  |  |  | D10 | D30 | D50 | D70 | D90 |  |
| Ex. 14 | 72 | 0.305 | 9.600 | 14.1 | 20.3 | 22.3 | 44.5 | 0.4 |
| Ex. 15 | 70 | 0.305 | 10.800 | 14.3 | 19.2 | 22.1 | 44.8 | 0.4 |
| Ex. 1 | 63 | 0.305 | 10.1 | 14.7 | 18.5 | 22.6 | 45.2 | 0.4 |
| Ex. 6 | 52 | 0.305 | 12.1 | 18.0 | 21.3 | 25.5 | 52.1 | 0.4 |
| Ex. 16 | 45 | 0.305 | 11.800 | 17.8 | 21.0 | 26.0 | 53.2 | 0.4 |

TABLE 6

| | loading amount of catalyst (g/L) | pressure loss (not coated with catalyst) | compressive strength (not coated with catalyst) |
|---|---|---|---|
| Ex. 14 | 120 | 75% | 32% |
| Ex. 15 | 120 | 80% | 52% |
| Ex. 1 | 120 | 100% | 100% |
| Ex. 6 | 120 | 160% | 200% |
| Ex. 16 | 120 | 210% | 250% |

(Results)

All of the plugged honeycomb structures of Examples 1 to 7 had the values of the variation ratio of pressure loss within 20%. That is, the plugged honeycomb structures of Examples 1 to 7 showed a small variation in pressure loss when a plurality of these plugged honeycomb structures was manufactured and catalyst was loaded at each of these plugged honeycomb structures. The plugged honeycomb structures of Example 1 to 7 had the number of exhausted PMs of $6 \times 10^{11}$ pieces/km or less, and these plugged honeycomb structures can be used favorably as a filter to purify exhaust gas.

On the contrary, the plugged honeycomb structures of Comparative Examples 1 to 3 and 5 to 7 had very large values of the variation ratio of pressure loss. The plugged honeycomb structure of Comparative Example 4 had a very large value of the number of exhausted PMs.

As shown in Table 4, the plugged honeycomb structures of Examples 1 and 8 to 13 had the values of pressure loss that increased with the thickness of the partition wall. The plugged honeycomb structures of Examples 1 and 8 to 13 had the values of compressive strength that decreased with the thickness of the partition wall. The plugged honeycomb structure of Example 8 including the partition wall of 0.470 mm in thickness had the value of pressure loss that exceeded 200% of the value of the pressure loss of the plugged honeycomb structure of Example 1 as the reference. The plugged honeycomb structure of Example 13 including the partition wall of 0.130 mm in thickness had the value of compressive strength that fell below 50% of the value of the compressive strength of the plugged honeycomb structure of Example 1 as the reference.

As shown in Table 6, the plugged honeycomb structures of Examples 1, 6 and 14 to 16 had the values of compressive strength that decreased with an increase in the porosity of the partition walls. The plugged honeycomb structures of Examples 1, 6 and 14 to 16 had the values of pressure loss that increased with a decrease in the porosity of the partition walls. The plugged honeycomb structure of Example 14 including the porosity of the partition walls of 72% had the value of compressive strength that fell below 50% of the value of the compressive strength of the plugged honeycomb structure of Example 1 as the reference. The plugged honeycomb structure of Example 16 including the porosity of the partition walls of 45% had the value of pressure loss that exceeded 200% of the value of the pressure loss of the plugged honeycomb structure of Example 1 as the reference.

The plugged honeycomb structure of the present invention can be used for a trapping filter to remove particulates and the like in exhaust gas.

DESCRIPTION OF REFERENCE NUMERALS 1, 21: partition wall, 2, 22: cell, 3: circumferential wall, 4, 24: honeycomb structure body, 5, 25: plugging portion, 11, 31: inflow end face, 12: outflow end face, 26: honeycomb segment, 27: segment circumferential wall, 28: bonding layer, 100, 200: plugged honeycomb structure.

What is claimed is:

1. A plugged honeycomb structure, comprising: a pillar-shaped honeycomb structure body having an inflow end face and an outflow end face and including porous partition walls disposed so as to surround a plurality of cells, the plurality of cells extending from the inflow end face to the outflow end face and serving as a through channel of fluid; and plugging portions disposed at open ends of the cells at the inflow end face side or at the outflow end face side, wherein the partition walls have a cumulative pore volume measured by mercury porosimetry, a pore diameter corresponding to the cumulative pore volume of 10% of an overall pore volume is D10, a pore diameter corresponding to the cumulative pore volume of 30% of the overall pore volume is D30, a pore diameter corresponding to the cumulative pore volume of 50% of the overall pore volume is D50, a pore diameter corresponding to the cumulative pore volume of 70% of the overall pore volume is D70, a pore diameter corresponding to the cumulative pore volume of 90% of the overall pore volume is D90, the pore diameter D10 is 6 μm or more, the pore diameter D90 is 58 μm or less, the plugged honeycomb structure satisfies the relationship of Expression (1)

$$0.35 \leq (D70-D30)/D50 \leq 1.5 \qquad \text{Expression (1):}$$

the partition walls comprise at least one type of material selected from the group consisting of silicon carbide, silicon-silicon carbide composite material, cordierite-silicon carbide composite material, silicon nitride, mullite, and alumina.

2. The plugged honeycomb structure according to claim 1, wherein the plugged honeycomb structure satisfies the relationship of Expression (2), $$0.40 \leq (D70-D30)/D50 \leq 1.3 \qquad \text{Expression (2):}$$

in Expression (2), D30 denotes the value of the pore diameter D30, D50 denotes the value of the pore diameter D50, and D70 denotes the value of the pore diameter D70.

3. The plugged honeycomb structure according to claim 1, wherein the pore diameter D10 is 7 μm or more.

4. The plugged honeycomb structure according to claim 1, wherein the pore diameter D90 is 52 μm or less.

5. The plugged honeycomb structure according to claim 1, wherein the partition walls have a thickness of 0.15 to 0.46 mm.

6. The plugged honeycomb structure according to claim 1, wherein the partition walls have a porosity of 50 to 70%.

7. The plugged honeycomb structure according to claim 1, wherein the partition walls are loaded with catalyst to purify exhaust gas, and a loading amount of the catalyst is 50 to 300 g/L.

* * * * *